United States Patent [19]

Rieder

[11] 4,172,802
[45] Oct. 30, 1979

[54] AQUEOUS METAL WORKING FLUID CONTAINING CARBOXYLIC ACID GROUP TERMINATED DIESTERS OF POLYOXYALKYLENE DIOLS

[75] Inventor: Walter E. Rieder, Arcadia, Calif.

[73] Assignee: Cincinnati Milacron Inc., Cincinnati, Ohio

[21] Appl. No.: 910,238

[22] Filed: May 30, 1978

[51] Int. Cl.$^2$ ............................................. C10M 1/06
[52] U.S. Cl. ........................................ 252/49.3; 72/42; 252/33.6; 252/34; 252/41; 252/48.6; 252/49.5; 252/52 A; 252/56 R; 260/410.6
[58] Field of Search ................ 252/33.6, 34, 41, 48.6, 252/49.3, 52 A, 56 R, 49.5

[56] References Cited

U.S. PATENT DOCUMENTS

| | | | |
|---|---|---|---|
| 2,602,065 | 7/1952 | De Groote | 252/342 |
| 2,703,811 | 3/1955 | Smith | 260/485 |
| 2,723,283 | 11/1955 | De Groote | 260/475 |
| 2,956,954 | 10/1960 | Hoare et al. | 252/57 |
| 3,006,849 | 10/1961 | Plemich | 252/49.3 X |
| 3,390,084 | 6/1968 | Lake | 252/49.3 X |
| 3,492,232 | 1/1970 | Rosenberg | 252/49.3 |
| 3,526,596 | 9/1970 | Kress et al. | 252/52 A X |
| 3,923,671 | 12/1975 | Knepp | 252/49.5 |
| 3,945,930 | 3/1976 | Sugiyama et al. | 252/52 A X |
| 4,075,393 | 2/1978 | Sturwold | 252/49.5 X |

Primary Examiner—Andrew Metz
Attorney, Agent, or Firm—Donald Dunn

[57] ABSTRACT

Aqueous metal working fluids exhibiting high lubricity and high stability are provided. These fluids comprise water and an acid terminated diester of a secondary diol or the amine or alkali metal salts of the ester.

30 Claims, No Drawings

AQUEOUS METAL WORKING FLUID CONTAINING CARBOXYLIC ACID GROUP TERMINATED DIESTERS OF POLYOXYALKYLENE DIOLS

FIELD OF INVENTION

The invention pertains to metal working fluid compositions and to metal working processes using such metal working fluid compositions. Further, this invention pertains to metal working fluid compositions having a high resistance to hydrolytic instability.

BACKGROUND

Oil based and aqueous metal working fluids have long been known in the art and used in metal working processes. Such fluids are known in the art to have lubricating and cooling functions which reduce friction and dissipate heat in metal working processes. This reduction of friction and dissipation of heat promotes long tool life, increases production and allows the attainment of high quality finished metal products. Aqueous metal working fluids, notwithstanding their effectiveness in metal working processes, have been known to have problems which reduce their effectiveness and/or useful life in metal working processes. Among such problems is the problem of hydrolytic instability. The art has continuously strived to overcome these problems, particularly hydrolytic instability, in view of the economic, safety and environmental attractiveness of the aqueous metal working fluids.

It is, therefore, an object of this invention to provide an aqueous metal working fluid composition having improved hydrolytic stability. Another object of this invention is to provide an aqueous metal working fluid composition having a long, useful, effective life in metal working processes. A still further object of this invention is to provide an aqueous metal working fluid which avoids disadvantages of prior art aqueous metal working fluids.

SUMMARY OF INVENTION

The above objects and others, as will be apparent from the following description and claims, are achieved by the metal working compositions of this invention. There are provided in accordance with this invention, metal working compositions comprising (a) water and (b) carboxylic acid group terminated diester of a polyoxyalkylene diol having two terminal secondary alcohol groups or the organic amine salt or the alkali metal salt of said diester.

DESCRIPTION OF THE INVENTION

It has now been discovered that many of the drawbacks of prior art metal working fluid compositions can be overcome and that highly stable, effective aqueous metal working fluid compositions are provided by this invention which comprise (a) water and (b) a carboxylic acid group terminated diester of a polyoxyalkylene diol having two terminal secondary alcohol groups or the organic amine salt or alkali metal salt of said diester. Further, in accordance with this invention there are provided metal working compositions comprising (a) water and (b) a carboxylic acid group terminated diester of a polyoxyalkylene diol having two terminal secondary alcohol groups, said diester having at least two terminal carboxylic acid groups per molecule, or the organic amine salt or alkali metal salt of said diester. Additionally, in accordance with this invention, there are provided metal working compositions comprising (a) water and (b) a carboxylic acid group terminated diester of a polyoxyalkylene diol having two terminal secondary alcohol groups per molecule, said diester having from two to four terminal carboxylic acid groups per molecule, or the organic amine salt or alkali metal salt of said diester. Still further in accordance with this invention there are provided metal working compositions comprising (a) water and (b) a carboxylic acid group terminated diester of a polyoxyalkylene diol having two terminal secondary alcohol groups per molecule, said diester having two terminal carboxylic acid groups per molecule, or the organic amine salt or alkali metal salt of said diester. Mixtures of different carboxylic acid group terminated diesters of polyoxyalkylene diols having two terminal alcohol groups or the organic amine or alkali metal salts thereof may be used in accordance with this invention. Further, there may be used in accordance with this invention combinations of carboxylic acid group terminated diesters of polyoxyalkylene diols having two secondary alcohol groups and organic amine or alkali metal salts of carboxylic acid group terminated diesters of polyoxyalkylene diols having two terminal secondary alcohol groups.

As an embodiment of the above described metal working compositions of this invention, there may be used as the organic amine salt an alkanol amine salt, preferably an alkanol amine salt having 1 to 3 alkanol groups. In a preferred practice of the above described metal working compositions of this invention there may be used as the organic amine salt an alkanol amine salt having from two to six carbon atoms in the alkylene groups of the alkanol amine. In another embodiment of the above described metal working compositions of this invention there may be used as the alkali metal salt, the sodium or potassium salt. With reference to the terminal carboxylic acid groups of the diester having at least two terminal carboxylic acid groups per molecule, of the above described metal working compositions of this invention, at least two of such terminal carboxylic acid groups must be separated by a polyoxyalkylene containing moiety.

In accordance with this invention there are also provided petroleum oil free metal working compositions comprising (a) water and (b) a carboxylic acid group terminated diester of a polyoxyalkylene diol having two terminal secondary alcohol groups or the organic amine salt or alkali metal salt of said diester. Additionally, there are provided in accordance with this invention petroleum oil free metal working compositions comprising (a) water and (b) a carboxylic acid group terminated diester of a polyoxyalkylene diol having two terminal secondary alcohol groups, said diester having at least two terminal carboxylic acid groups per molecule, or the organic amine salt or alkali metal salt of said diester. There are also provided in accordance with this invention petroleum oil free metal working compositions comprising (a) water and (b) a carboxylic acid group terminated diester of a polyoxyalkylene diol having two terminal secondary alcohol groups, said diester having from two to four terminal carboxylic acid groups per molecule, or the organic amine salt or alkali metal salt of said diester.

The carboxylic acid group terminated diesters and salts thereof of the above disclosed metal working compositions of this invention may be described by the following general formula

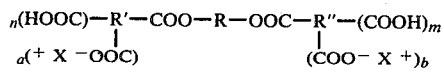

wherein R is the divalent radical residue of a secondary alcohol terminated polyoxyalkylene homopolymer or copolymer diol absent the terminal hydroxyl groups, R′ and R″ are the same or different and are selected from aliphatic, aromatic, cycloaliphatic, aryl aliphatic, alkyl aromatic, heteroaliphatic having S or O-heteroatoms, heteroaromatic having O or N heteroatoms, halogen substituted aliphatic or halogen substituted aromatic radicals having a free valence of a+n+1 and b+m+1 respectively, n is 0 to 3, m is 0 to 3, X is organic amine cation or alkali metal ion, a is 0 to 3, b is 0 to 3, a+n is 0 to 3, b+m is 0 to 3 and a+b+m+n is 1 to 6. In a particular aspect of this invention the above general formula and the definitions pertaining thereto may be substituted for the described carboxylic acid group terminated diesters of the above taught metal working compositions of this invention. It is, of course, to be recognized that the carboxylic acid group terminated diester in accordance with the above general formula may, in keeping with the previous disclosure herein, be used in the metal working compositions of this invention in the form of its organic amine salt or its alkali metal salt, preferably the alkanol amine salt or the sodium or potassium salts.

As a preferred embodiment of the metal working compositions of this invention R′ and R″ of the above general formula, for the carboxylic acid group terminated diester and organic amine salts or alkali metal salts thereof, are the same or different hydrocarbon radicals selected from aliphatic, $C_6$ aromatic, cycloaliphatic, aryl aliphatic having 6 carbons in the aryl group, alkyl $C_6$ aromatic, halogen substituted aliphatic or halogen substituted $C_6$ aromatic hydrocarbon radicals having a free valence of a+n+1 and b+m+1 respectively. In another preferred embodiment of this invention, wherein organic amine salts or alkali metal salts the diester are according to the above general formula, R′ and R″ are the same or different saturated or unsaturated, branched or unbranched aliphatic hydrocarbon radicals having from 2 to 20 carbon atoms, n is 0, a is 1, b is 1 and m is 0. Among other preferred embodiments of this invention wherein the carboxylic acid group terminated diester and the organic amine or alkali metal salts thereof are according to the above general formula include wherein (1) R′ and R″ are the same or different aliphatic hydrocarbon radicals having a sulfur hetero chain atom, n is 1 or a is 1 and m is 1, or b is 1, (2) R′ and R″ are the same or different monocyclic aromatic hydrocarbon radicals having 6 carbon atoms, optionally halogen substituted, n is 1 to 2, or a is 1 to 2 and m is 1 to 2 or b is 1 to 2, (3) R′ and R″ are the same or different aryl aliphatic hydrocarbon radicals wherein the aryl group is a monocyclic aryl group having six carbon atoms, (4) R′ and R″ are the same or different alkyl aromatic hydrocarbon radicals wherein the aromatic group is a monocyclic aromatic group having six carbon atoms, (5) R′ and R″ are cycloaliphatic hydrocarbon radicals having six carbon atoms in the cycloaliphatic ring, and (6) n is 1 to 3, or a is 1 to 3, m is 1 to 3, or b is 1 to 3 and a+b+m+n is 2 to 6. Preferably the organic amine salts of the carboxylic acid group terminated diester according to the above general formula are alkanol amine salts more preferably alkanol amine salts having 1 to 3 alkanol groups containing from 2 to 6 carbon atoms in each alkanol group. The alkali metal salts of the carboxylic acid group terminated diester according to the above general formula are preferably the sodium or potassium salts.

In accordance with the above general formula for the carboxylic acid group terminated diester of the metal working compositions of this invention, as well as the organic amine salts or alkali metal salts of said diesters, R preferably is the hydroxyl free residue of a secondary alcohol group terminated polyoxyalkylene homopolymer or copolymer diol in which the oxyalkylene group of the homopolymer diol has a branched alkylene group having 3 to 4 carbon atoms, a secondary carbon atom bonded to oxygen and is described by the formula

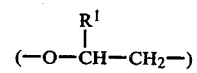

where $R^1$ is methyl or ethyl and the oxyalkylene groups of the copolymer diol have from 2 to 4 carbon atoms with the proviso that in the copolymer diol at least the terminal oxyalkylene groups contain a branched $C_3$ to $C_4$ alkylene group of the formula

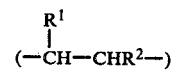

where $R^1$ is methyl or ethyl and $R^2$ is H or methyl and the secondary carbon atom is bonded to oxygen.

The aqueous metal working compositions of this invention advantageously can be used in such metal removal and non metal removal metal working processes as milling, turning, drilling, grinding, deep drawing, drawing and ironing, reaming, punching and spinning. Increased tool life, lower working forces, reduced heat build up and improved surface finish are a few of the advantages realized by the use of the metal working compositions of this invention in metal working processes. A still further and particularly significant advantage of the metal working compositions of this invention lies in the high stability of the compositions. The metal working compositions of this invention and particularly the carboxyl terminated diester and salts thereof are resistant to break down especially upon storage for prolonged periods. This resistance to break down is present in the metal working compositions of this invention which have not been used in a metal working process but simply stored awaiting such use, as well as the metal working compositions of this invention which have been intermittently stored for short intervals, e.g., overnight, upon being used in metal working processes. The resistance to break down exhibited by the metal working compositions of this invention, particularly the carboxyl terminated diester and salts thereof, prolongs their effective and useful life in metal working processes. Such prolonged effective and useful life of the metal working compositions of this invention translates to economics in the metal working processes (e.g., less down time and lower metal working fluid consumption), because of their high precipitation and separation resistance.

In the practice of the metal working compositions of this invention the carboxylic acid group terminated diester according to the previously described general formula may be prepared in accordance with conventional methods well known in the art by reacting 2 moles of a dicarboxylic acid or tricarboxylic acid of mixtures of dicarboxylic acids and tricarboxylic acids with 1 mole of a secondary alcohol group terminated polyoxyalkylene homopolymer or copolymer diol. As examples of dicarboxylic acids and tricarboxylic acids usable in the preparation of the carboxylic acid group terminated diester there includes, but not limited to succinic, isosuccinic, chlorosuccinic, glutaric, pyrotartaric, adipic, chloroadipic, pimelic, suberic, chlorosuberic, azeleic, sebacic, brassylic, octadecanedioic, thapsic, eicosanedioic, maleic, fumaric, citriconic, mesaconic, tricarballylic, aconitic, 1,2-benzene dicarboxylic, 1,3-benzene dicarboxylic, 1,4-benzene dicarboxylic, tetrachlorophthalic, tetrahydrophthalic, chlorendic, hemimellitic, trimellitic, trimesic, 2-chloro-1,3,5-benzene tricarboxylic, hexahydrophthalic, hexahydroisophthalic, hexahydroterephthalic, phenyl succinic, 2-phenyl pentanedioic, thiodipropionic acids, carboxylic acid products of the dimerization and polymerization of $C_8$ to $C_{26}$ monomeric unsaturated fatty acids such as described in U.S. Pat. No. 2,482,760 (C. C. Goebel—Sept. 27, 1949), U.S. Pat. No. 2,482,761 (C. C. Goebel—Sept. 27, 1949), U.S. Pat. No. 2,731,481 (S. A. Harrison—Jan. 17, 1956), U.S. Pat. No. 2,793,219 (F. O. Barrett et al.—May 21, 1957), U.S. Pat. No. 2,964,545 (S. A. Harrison—Dec. 13, 1960), U.S. Pat. No. 2,978,468 (B. L. Hampton—Apr. 4, 1961), U.S. Pat. No. 3,157,681 (E. M. Fisher—Nov. 17, 1964) and U.S. Pat. No. 3,256,304 (C. M. Fisher et al.—June 14, 1966), the carboxylic acid products of the Diels Alder type reaction of an unsaturated fatty acid with $\alpha$, $\beta$-ethylenic carboxy acid (e.g., acrylic, methacrylic, maleic or fumaric acids) such as are taught in U.S. Pat. No. 2,444,328 (C. M. Blair, Jr.—June 29, 1948), the disclosure of which is incorporated herein by reference, and the Diels Alder adduct of a three to four carbon atom $\alpha$, $\beta$-ethylenically unsaturated alkyl monocarboxylic or dicarboxylic acid (e.g., acrylic and fumaric acids respectively) and pimeric or abietic acids. Examples of the dimerized and polymerized $C_8$ to $C_{26}$ monomeric unsaturated fatty acids include but are not limited to such products as Empol® 1014 Dimer Acid, Empol® 1016 Dimer Acid and Empol® 1040 Trimer Acid each available from Emery Industries, Inc. As examples of the carboxylic acid product of a Diels Alder type reaction there may be cited the commercially available Westvaco® Diacid 1525 and Westvaco® Diacid 1550, both being available from the Westvaco Corporation. In place of the dicarboxylic acid or tricarboxylic acid there may be used the corresponding anhydride or acid halide, where the acid admits of the formation of the anhydride and acid halide, e.g., acid chloride, in preparing the carboxylic acid terminated diester. Where there is used the corresponding acid halide of the dicarboxylic and tricarboxylic acid to prepare the carboxylic acid group terminated diester it is, of course, necessary to convert the terminal acid halide groups of the acid halide terminated diester product, resulting from the reaction of the acid halide with the secondary alcohol group terminated polyoxyalkylene homopolymer or copolymer diol, to the corresponding carboxylic acid groups. Such conversion of the terminal acid halide groups to carboxylic acid groups may be accomplished by methods well known in the art.

The secondary alcohol group terminated polyoxyalkylene homopolymers and copolymers that may be used to prepare the carboxylic acid group terminated diester of the metal working compositions of this invention, for example include but are not limited to polyoxypropylene diol, polyoxybutylene diol, polyoxypropylene/polyoxyethylene/polyoxypropylene block copolymer diol, polyoxybutylene/polyoxyethylene/polyoxybutylene, block copolymer diol, polyoxybutylene/polyoxypropylene/polyoxybutylene block copolymer diol and polyoxypropylene/polyoxybutylene/polyoxypropylene block copolymer diol. The polyoxybutylene may be obtained from 1,2 oxybutylene or 2,3 oxybutylene. In respect to the polyoxyalkylene copolymer diols the copolymer may be a block or a random copolymer provided that the terminal alkylene groups of the copolymer have a hydroxyl group bonded to a secondary carbon atom. The length of the polyoxyalkylene blocks, i.e., the number of oxyalkylene groups in the block, may vary widely. Thus, in accordance with this invention the terminal polyoxyalkylene blocks must be polyoxypropylene or polyoxybutylene blocks. These terminal polyoxypropylene or polyoxybutylene blocks may contain as few as 2 oxypropylene units or 2 oxybutylene units respectively or there may be present from 3 to 20 oxypropylene or oxybutylene units. The molecular weight of the polyoxyalkylene diols used to prepare the carboxylic acid group terminated diester may ary over a wide range. Thus, there may be used polyoxyalkylene diols, having terminal hydroxyl groups bonded to secondary carbon atoms, whose average molecular weight may vary from about 150 to about 4000, preferably from about 300 to 2000 and more preferably from about 300 to 1500. It is also preferred to use liquid polyoxyalkylene diols having terminal hydroxyl group bonded to a secondary carbon atom.

As the organic amine salts of the carboxylic acid group terminated diesters in the metal working compositions of this invention there may be used the alkyl primary amine, alkyl secondary amine, alkyl tertiary amine and preferably the monoalkanol amine, dialkanol amine and trialkanol amine salts. Alkyl primary, secondary and tertiary amine salts of the carboxylic acid group terminated diester, having from 2 to 8 carbon atoms in the alkyl group of the amine, may be used in the practice of this invention. It is, however, preferred to use the monoalkanol amine, dialkanol amine and trialkanol amine salts of the carboxylic acid group terminated diester, wherein the alkanol group contains from 2 to 8 carbon atoms and may be branched or unbranched, in the practice of this invention. The use of the monalkanol amine and trialkanol amine salts of the carboxylic acid group terminated diester, wherein the alkanol group has from 2 to 8 carbon atoms, is still more preferred in the practice of this invention. Organic amines which may also be used to form the amine salts of the carboxylic acid group terminated diesters in the metal working compositions of this invention also include $C_2$ to $C_6$ alkylene diamines, poly($C_2$ to $C_4$ oxyalkylene) diamines having a molecular weight of from about 200 to about 900, N-$C_1$ to $C_8$ alkyl $C_2$ to $C_6$ alkylene diamine, N,N'-di $C_1$ to $C_8$ alkyl $C_2$ to $C_6$ alkylene diamine, N,N,N'-tri $C_1$ to $C_8$ alkyl $C_2$ to $C_6$ alkylene diamine, N,N,N',N'-tetra $C_1$ to $C_8$ alkyl $C_2$ to $C_6$ alkylene diamine, N-alkanol $C_2$ to $C_6$ alkylene diamine, N,N'-dialkanol $C_2$ to $C_6$ alkylene diamine, N,N,N'-trialkanol $C_2$ to $C_6$ alkylene diamine N,N,N',N'-tetraalkanol $C_2$ to $C_6$ alkylene diamine and $CH_3CH_2O(CH_2CH_2O)_n CH_2CH_2CH_2NH_2$ wherein n is 1 or 2. Alkyl alkanol amines having from 2 to 8 carbon atoms in the alkyl and alkanol groups may also be used as the organic amine in the practice of this invention.

Examples of alkyl amines, which may be used to form the alkyl amine salts of the carboxylic acid group terminated diester in the practice of this invention, include but are not limited to ethyl amine, butyl amine, propyl amine, isopropyl amine, secondary butyl amine, tertiary butyl amine, hexyl amine, isohexyl amine, n-octyl amine, 2-ethyl hexyl amine, diethyl amine, dipropyl amine, diisopropyl amine, dibutyl amine, ditertiary butyl amine, dihexyl amine, di n-octyl amine, di 2-ethyl hexyl amine, triethyl amine, tripropyl amine, triisopropyl amine, tributyl amine, tri secondary butyl amine, trihexyl amine tri n-octyl amine and tri 2-ethyl hexyl amine. As examples of alkanol amines, which may be used to make the alkanol amine salts of the carboxyl group terminated diester in the practice of this invention, there include, but not limited to, monoethanol amine, monobutanol amine, monopropanol amine, monoisopropanol amine, monoisobutanol amine, monohexanol amine, monooctanol amine, diethanol amine, dipropanol amine, diisopropanol amine, dibutanol amine, dihexanol amine, diisohexanol amine, dioctanol amine, triethanol amine, tripropanol amine, triisopropanol amine, tributanol amine, triisobutanol amine, trihexanol amine, trisohexanol amine, trioctanol amine and triisooctanol amine.

Polyoxyalkylene diamines usable in the practice of this invention include for example polyoxyethylene diamines and polyoxypropylene diamines having molecular weights of from about 200 to about 900. There may also be used in the practice of this invention amines such as methoxypropylamine, dimethyl aminopropyl amine, 1,3-propylene diamine, ethylene diamine, 3(2-ethoxyethoxy)propyl amine, N,N,N',N'-tetramethyl-1,3-butane diamine, mono ethanol ethylene diamine, N,N'-diethanol ethylene diamine, N,N,N'-tetra hydroxymethyl ethylene diamine, N,N-diethyl ethanol amine and N-ethyl diethanol amine.

The organic amine salt of the carboxylic acid group terminated diester may be prepared by methods well known in the art such as, for example, by simply adding the organic amine to the carboxylic acid group terminated diester in the presence of an aqueous medium or conversely adding the carboxylic acid group terminated diester to the organic amine in the presence of an aqueous medium. In an alternative method, the aqueous medium may be omitted.

As alkali metal salts of the carboxylic acid group terminated diester there are included the lithium, sodium, potassium, rubidium and cesium salts. The lithium, sodium and potassium, salts are, however, preferred. Formation of the alkali metal salts of the carboxylic acid group terminated diester may be accomplished by methods well known in the art such as for example by adding the carboxylic acid group terminated diester to the hydroxide of the alkali metal in the presence of an aqueous medium.

In the practice of this invention, the metal working compositions may be prepared by conventional methods well known in the art. Thus, for example, the metal working compositions may be prepared by (1) adding the carboxylic acid group terminated diester to water or (2) adding the amine salt of the carboxylic acid group terminated diester to water or (3) adding the carboxylic acid group terminated diester to water and then adding the organic amine or (4) adding the organic amine to water and the adding the carboxylic acid group terminated diester or (5) adding the carboxylic acid group terminated diester to water and then adding an alkali metal hydroxide or (6) adding the carboxylic acid group terminated diester to water containing an alkali metal hydroxide.

There may be added to the metal working compositions of this invention, in conventional amounts well known in the art, various additives such as corrosion inhibitors, biocides, fungicides, bacteriocides, surfactants, extreme pressure agents and antioxidants well known in the art.

The metal working compositions of this invention may have therein a concentration of the carboxylic acid terminated diester or the organic salt or alkali salt thereof over a wide range, preferably from 0.10% to 20% more preferably 0.03% to 5%, by weight of the weight of water plus the weight of carboxylic acid group terminated diester or organic amine or alkali metal salt thereof.

This invention has been described above with respect to various embodiments thereof and is further described in the following non limiting examples, in which all amounts and percentages are by weight.

In the following examples

PEP 400 is a polyoxypropylated polyoxyethylene copolymer diol, the product having an average molecular weight of about 600

PPG 400 is a polyoxypropylene diol having an average molecular weight of about 400

PPG 300 is a polyoxypropylene diol having an average molecular weight of about 300

PPG 1200 is a polyoxypropylene diol having an average molecular weight of about 1200

PBG 1000 is a polyoxybutylene diol having an average molecular weight of about 1000

PBG 1500 is a polyoxybutylene diol having an average molecular weight of about 1500

BEB 14002 is a diol resulting from a polyoxyethylene chain, having an average molecular weight of about 400, capped at both ends with butylene oxide such that two moles of butylene oxide are at one end of the polyoxyethylene chain and one mole of butylene oxide is at the other end of the chain.

Empol ® 1014 Dimer acid: A polymerized fatty acid having a typical composition of 95% dimer acid ($C_{36}$ dibasic acid) approx. mol. wt. 565, 4% trimer acid ($C_{54}$ tribasic acid) approx. mol. wt. 845 and 1% monobasic acid ($C_{18}$ fatty acid) approx. mol. wt. 282 available from Emery Industries, Inc.

Emplo ® 1016 Dimer acid: A polymerized fatty acid having a typical composition of 87% Dimer acid ($C_{36}$ dibasic acid) approx. mol. wt. 565, 13% trimer acid ($C_{54}$ tribasic acid) approx. mol. wt. 845 and a trace of monobasic acids ($C_{18}$ fatty acids) approx. mol. wt. 282 available from Emery Industries, Inc.

Westvaco ® Diacid 1525: The Diels Alder reaction product of tall oil and acrylic acid available from Westvaco Corp.

Westvaco ® Diacid 1550: The Diels Alder reaction product of tall oil and acrylic acid, said product refined to contain about 10% monoacids, available from the Westvaco Corp.

EXAMPLE 1

| | |
|---|---|
| Carboxylic acid terminated diester reaction product of 2 moles of Empol® 1014 Dimer Acid and 1 mole of PEP 400 | 15.00gms |
| Potassium hydroxide | 5.64gms |
| Water | 497.36gms |

EXAMPLE 2

| | |
|---|---|
| Diester reaction product of Example 1 | 15.00gms |
| Sodium hydroxide | 4.02gms |
| Water | 480.98gms |

EXAMPLE 3

| | |
|---|---|
| Diester reaction product of Example 1 | 15.00gms |
| Triethanol amine | 15.00gms |
| Water | 470.00gms |

EXAMPLE 4

| | |
|---|---|
| Diester reaction product of Example 1 | 15.00gms |
| monoisopropanol amine | 7.55gms |
| Water | 477.45gms |

EXAMPLE 5

| | |
|---|---|
| Carboxylic acid group terminated diester reaction product of 2 moles of Empol® 1014 Dimer Acid and 1 mole of PPG 400 | 15.00gms |
| Triethanol amine | 15.00gms |
| Water | 470.00gms |

EXAMPLE 6

| | |
|---|---|
| Carboxylic acid group terminated diester reaction product of 2 moles of Empol® 1014 Dimer Acid and 1 mole of PPG 300 | 15.00gms |
| Triethanol amine | 15.00gms |
| Water | 470.00gms |

EXAMPLE 7

| | |
|---|---|
| Carboxylic acid group terminated diester reaction of product of 2 moles of Azelaic acid and 1 mole of PEP 400 | 15.00gms |
| Triethanol amine | 15.00gms |
| Water | 470.00gms |

EXAMPLE 8

| | |
|---|---|
| Carboxylic acid group terminated diester reaction product of 2 moles of Azelaic acid and 1 mole of PPG 400 | 15.00gms |
| Triethanol amine | 15.00gms |
| Water | 470.00gms |

EXAMPLE 9

| | |
|---|---|
| Carboxylic acid group terminated diester reaction product of 2 moles of Azelaic acid and 1 mole of PPG 300 | 15.00gms |
| Triethanol amine | 15.00gms |
| Water | 470.00gms |

EXAMPLE 10

| | |
|---|---|
| Carboxylic acid group terminated diester reaction product of 2 moles of Adipic acid and 1 mole of PEP 400 | 15.00gms |
| Water | 485.00gms |

EXAMPLE 11

| | |
|---|---|
| Carboxylic acid group terminated diester reaction product of Example 10 | 15.00gms |
| Triethanol amine | 15.00gms |
| Water | 470.00gms |

EXAMPLE 12

| | |
|---|---|
| Carboxylic acid group terminated diester reaction product of 2 moles of Westvaco® Diacid 1525 and 1 mole of PEP 400 | 15.00gms |
| Potassium hydroxide | 5.64gms |
| Water | 479.36gms |

EXAMPLE 13

| | |
|---|---|
| Carboxylic acid group terminated diester reaction product of Example 12 | 15.00gms |
| Sodium hydroxide | 4.02gms |
| Water | 480.98gms |

EXAMPLE 14

| | |
|---|---|
| Carboxylic acid group terminated diester reaction product of Example 12 | 15.00gms |
| Triethanol amine | 15.00gms |
| Water | 470.00gms |

EXAMPLE 15

| | |
|---|---|
| Carboxylic acid group terminated diester reaction product of Example 12 | 15.00gms |
| Monoisopropanol amine | 7.55gms |
| Water | 477.45gms |

EXAMPLE 16

Carboxylic acid group terminated

-continued

| | |
|---|---|
| diester reaction product of 2 moles of Westvaco ® Diacid 1525 and 1 mole of PPG 400 | 15.00gms |
| Triethanol amine | 15.00gms |
| Water | 470.00gms |

EXAMPLE 17

| | |
|---|---|
| Carboxylic acid group terminated diester reaction product of 2 moles of Westvaco ® Diacid 1525 and 1 mole of PPG 1200 | 15.00gms |
| Triethanol amine | 15.00gms |
| Water | 470.00gms |

EXAMPLE 18

| | |
|---|---|
| Carboxylic acid group terminated diester reaction product of Example 9 | 0.60gms |
| Triethanol amine | 0.60gms |
| Water | 498.80gms |

EXAMPLE 19

| | |
|---|---|
| Carboxylic acid group terminated diester reaction product of Example 9 | 1.50gms |
| Triethanol amine | 1.50gms |
| Water | 497.00gms |

EXAMPLE 20

| | |
|---|---|
| Carboxylic acid group terminated diester reaction product of Example 9 | 6.0gms |
| Triethanol amine | 6.0gms |
| Water | 488.0gms |

EXAMPLE 21

| | |
|---|---|
| Carboxylic acid group terminated diester reaction product of Example 9 | 60.0gms |
| Triethanol amine | 60.0gms |
| Water | 380.0gms |

EXAMPLE 22

| | |
|---|---|
| Carboxylic acid group terminated diester reaction product of 2 moles of phthalic anhydride and 1 mole of PEP 400 | 15.00gms |
| Triethanol amine | 15.00gms |
| Water | 470.00gms |

EXAMPLE 23

| | |
|---|---|
| Carboxylic acid group terminated diester reaction product of 2 moles of 3,3' thiodipropionic acid and 1 mole of PEP 400 | 15.0gms |
| Water | 485.0gms |

EXAMPLE 24

| | |
|---|---|
| Carboxylic acid group terminated diester reaction product of Example 23 | 15.0gms |
| Triethanol amine | 15.0gms |
| Water | 470.0gms |

EXAMPLE 25

| | |
|---|---|
| Carboxylic acid group terminated diester reaction product of 2 moles of 3,3' thiodipropionic acid and 1 mole of PPG 400 | 15.0gms |
| Triethanol amine | 15.0gms |
| Water | 470.0gms |

EXAMPLE 26

| | |
|---|---|
| Carboxylic acid group terminated diester reaction product of 2 moles of suberic acid and 1 mole of PEP 400 | 15.0gms |
| Triethanol amine | 15.0gms |
| Water | 470.0gms |

EXAMPLE 27

| | |
|---|---|
| Carboxylic acid group terminated diester reaction product of 2 moles of Empol ® 1016 Dimer acid and 1 mole of PPG 400 | 15.0gms |
| Triethanole amine | 15.0gms |
| Water | 470.0gms |

EXAMPLE 28

| | |
|---|---|
| Carboxylic acid group terminated diester reaction product of 2 moles of Empol ® 1016 Dimer acid and 1 mole of PBG 1000 | 15.0gms |
| Triethanol amine | 15.0gms |
| Water | 470.0gms |

EXAMPLE 29

| | |
|---|---|
| Carboxylic acid group terminated diester reaction product of 2 moles of Empol ® 1016 Dimer acid and 1 mole of PBG 1500 | 15.0gms |
| Triethanol amine | 15.0gms |
| Water | 470.0gms |

EXAMPLE 30

| | |
|---|---|
| Carboxylic acid group terminated diester reaction product of 2 moles tetrachlorophthalic anhydride and 1 mole of PEP 400 | 15.0gms |
| Triethanol amine | 15.0gms |
| Water | 470.0gms |

EXAMPLE 31

| | |
|---|---|
| Carboxylic acid group terminated diester reaction product of 2 moles of Westvaco ® Diacid 1550 and 1 mole of PEP 400 | 15.0gms |

-continued

| | |
|---|---|
| Triethanol amine | 15.0gms |
| Water | 470.0gms |

EXAMPLE 32

| | |
|---|---|
| Carboxylic acid group terminated diester reaction product of 2 moles of heptadecane dicarboxylic acid and 1 mole of PEP 400 | 15.0gms |
| Triethanol amine | 15.0gms |
| Water | 470.0gms |

EXAMPLE 33

| | |
|---|---|
| Carboxylic acid group terminated diester reaction product of 2 moles of succinic acid and 1 mole of PPG 1200 | 15.00gms |
| Monobutanol amine | 8.97gms |
| Water | 476.03gms |

EXAMPLE 34

| | |
|---|---|
| Carboxylic acid group terminated diester reaction product of 2 moles of octadecane dioic acid and 1 mole of PBG 1000 | 15.00gms |
| Diisopropanol amine | 13.39gms |
| Water | 471.61gms |

EXAMPLE 35

| | |
|---|---|
| Carboxylic acid group terminated diester reaction product of 2 moles of hexahydro-terephthalic acid and 1 mole of PEP 400 | 15.0gms |
| Diethanol amine | 10.5gms |
| Water | 474.5gms |

Metal working compositions of this invention were evaluated for lubricity in accordance with the following test procedure and the results shown in the table below.

TEST PROCEDURE

A wedge-shaped high-speed steel tool is forced against the end of a rotating (25 surface meters per minute) SAE 1020 steel tube of ¼ inch wall thickness. The feed force of the tool is sufficient to cut a V-groove in the tubing wall, and the chips flow out of the cutting area in two pieces (one piece from each face of the wedge-shaped tool). The forces on the tool as a result of workpiece rotation and of tool feed are measured by a tool post dynamometer connected to a Sanborn recorder. Any welding of chips to tool build-up is reflected in the interruption of chip-flow (visual) and in increased resistance to workpiece rotation. The cutting test is performed with the tool-chip interface flooded throughout the operation with circulating test fluid. Tool and workpiece are in constant dynamic contact during this time, and the test is not begun until full contact is achieved all along each cutting edge. The duration of the test is three minutes.

| Metal Working Composition[1] | Force (lbs.) |
|---|---|
| Example 1 | 505 |
| Example 2 | 515 |
| Example 3 | 438 |
| Example 4 | 468 |
| Example 5 | 450 |
| Example 6 | 439 |
| Example 7 | 353 |
| Example 8 | 391 |
| Example 9 | 390 |
| Example 10 | 386 |
| Example 11 | 407 |
| Example 12 | 488 |
| Example 13 | 507 |
| Example 14 | 467 |
| Example 15 | 468 |
| Example 16 | 449 |
| Example 17 | 447 |
| Example 18 | 515 |
| Example 19 | 486 |
| Example 20 | 436 |
| Example 21 | 353 |
| Example 22 | 510 |
| Example 23 | 340 |
| Example 24 | 387 |
| Example 25 | 389 |
| Example 26 | 377 |
| Example 27 | 442 |
| Example 28 | 357 |
| Example 29 | 332 |
| Example 30 | 364 |
| Example 31 | 424 |
| Example 32 | 439 |
| Water (distilled) | 531 |

[1] 500 grams of the composition of the specified example were diluted to 3000 grams with water to obtain the metal working fluid employed in the test.

In Examples 1 to 32 distilled water was used to prepare the compositions.

What is claimed is:

1. A metal working composition comprising (a) water and (b) carboxylic acid group terminated diester of a polyoxyalkylene diol having terminal secondary alcohol groups, said diester or the organic amine or alkali metal salts thereof having the following formula

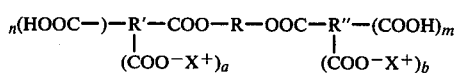

wherein
R is a divalent radical residue of a secondary alcohol terminated polyoxyalkylene homopolymer or copolymer diol absent the terminal hydroxyl groups,
R' and R" are the same or different aliphatic hydrocarbon, $C_6$ aromatic, aryl aliphatic hydrocarbon having 6 carbon atoms in the aryl group, alkyl $C_6$ aromatic, heteroaliphatic having a sulfur heteroatom, halogen substituted aliphatic hydrocarbon or halogen substituted $C_6$ aromatic radicals having a free valence of $a+n+1$ and $b+m+1$ respectively,
X is an organic amine cation or alkali metal ion,
a is 0 to 3,
b is 0 to 3,
m is 0 to 3,
n is 0 to 3,
a+n is 0 to 3,
b+m is 0 to 3 and
a+b+m+n is 1 to 6
with the proviso that when a+n is 2 or 3 then b+m must be 1 to 3.

2. A metal working composition according to claim 1 wherein R' and R" are the same or different radicals having a free valence of $a+n+1$ and $b+m+1$ respectively and selected from the group consisting of aliphatic, aromatic having 6 ring carbon atoms, cycloaliphatic, aryl aliphatic having 6 carbon atoms in the aryl group, alkyl aromatic having 6 carbon atoms in the aromatic ring hydrocarbon radicals, halogen substituted aliphatic hydrocarbon radicals and halogen substituted aromatic radicals having 6 carbon atoms in the ring.

3. A metal working composition according to claim 2 wherein R' and R" are the same or different saturated or unsaturated aliphatic hydrocarbon radicals having from two to twenty carbon atoms and a free valence of $a+n+1$ and $b+m+1$ respectively.

4. A metal working composition according to claim 2 wherein R' and R" are the same of different aromatic hydrocarbon radicals having six carbon atoms in the aromatic ring and a free valence of $a+n+1$ and $b+m+1$ respectively.

5. A metal working composition according to claim 2 wherein R' annd R" are the same or different cycloaliphatic hydrocarbon radicals having a free valence of $a+n+1$ and $b+m+1$ respectively.

6. A metal working composition according to claim 2 wherein R' and R" are the same or different aryl aliphatic hydrocarbon radicals having six carbon atoms in the aryl group and a free valence of $a+n+1$ and $b+m+1$ respectively.

7. A metal working composition according to claim 2 wherein R' and R" are the same or different alkyl aromatic hydrocarbon radicals having six carbon atoms in the aromatic ring and a free valence of $a+n+1$ and $b+m+1$ respectively.

8. A metal working composition according to claim 2 wherein R' and R" are the same or different halogen substituted aromatic radicals having six carbon atoms in the aromatic ring and a free valence of $a+n+1$ and $b+m+1$ respectively.

9. A metal working composition according to claim 2 wherein R' and R" are carboxyl free polymerized fatty acid radical products of the polymerization of two or three molecules of an ethylenically unsaturated fatty acid having from twelve to twenty-six carbon atoms.

10. A metal working composition according to claim 2 wherein R' and R" are the divalent radical product of thiodipropionic acid absent its carboxyl groups.

11. Metal working compositions according to claim 2 wherein R is a divalent radical residue of a secondary alcohol terminated polyoxyalkylene homopolymer diol absent the terminal hydroxyl groups.

12. Metal working compositions according to claim 2 wherein R is a divalent radical residue of a secondary alcohol terminated polyoxyalkylene copolymer diol absent the terminal hydroxyl groups.

13. Metal working compositions according to claims 11 or 12 wherein the oxyalkylene group of the polyoxyalkylene has from two to six carbon atoms.

14. Metal working compositions according to claims 3, 4, 5, 6, 7, 8, 9 or 10 wherein R is the divalent radical residue of polyoxypropylene diol having an average molecular weight of from 150 to 4000, absent the terminal hydroxyl groups and $a+b+m+n$ is 1 1 to 4.

15. Metal working compositions according to claims 3, 4, 5, 6, 7, 8, 9 or 10 wherein R is the divalent radical residue of polyoxybutylene diol having an average molecular weight of from 150 to 4000, absent the terminal hydroxyl groups and $a+b+m+n$ is 1 to 4.

16. Metal working compositions according to claims 3, 4, 5, 6, 7, 8, 9 or 10 wherein R is the divalent radical residue of a polyoxypropylene/polyoxethylene/polyoxypropylene block copolymer diol having an average molecular weight of from 150 to 4000, absent the terminal hydroxyl groups and $a+b+m+n$ is 1 to 4.

17. Metal working compositions according to claims 3, 4, 5, 6, 7, 8, 9 or 10 wherein R is a divalent radical residue of a polyoxybutylene/polyoxyethylene/polyoxybutylene block copolymer diol having an average molecular weight of from 150 to 4000, absent the terminal hydroxyl groups and $a+b+m+n$ is 1 to 4.

18. Metal working compositions according to claim 14 wherein the polyoxypropylene diol has an average molecular weight of from 300 to 2000.

19. Metal working compositions according to claim 15 wherein the polyoxybutylene diol has an average molecular weight of from 300 to 2000.

20. Metal working compositions according to claim 16 wherein the polyoxypropylene/polyoxyethylene/polyoxypropylene block copolymer diol has an average molecular weight of from 300 to 2000.

21. Metal working compositions according to claim 17 wherein the polyoxybutylene/polyoxethylene/polyoxybutylene block copolymer diol has an average molecular weight of from 300 to 2000.

22. Metal working compositions according to claim 2 wherein (b) is an alkyl amine salt having from two to six carbon atoms in the alkyl group.

23. Metal working compositions according to claim 2 wherein (b) is an alkanol amine salt having from two to four carbon atoms in the alkanol group.

24. Metal working compositions according to claim 14 wherein (b) is a monoalkanol or trialkanol amine salt having from two to four carbon atoms in the alkanol group.

25. Metal working compositions according to claim 15 wherein (b) is a monoalkanol or trialkanol amine salt having from two to four carbon atomms in the alkanol group.

26. Metal working compositions according to claim 16 wherein (b) is a monoalkanol or trialkanol amine salt having from two to four carbon atoms in the alkanol group.

27. Metal working compositions according to claim 17 wherein (b) is a monoalkanol or trialkanol amine salt having from two to four carbon atoms in the alkanol group.

28. Metal working compositions according to claim 2 wherein X is a sodium or potassium ion, m is 0 or 1, n is 0 or 1, a is 1 or 2, b is 0 to 2 and $a+b+m+n$ is 1 to 4.

29. Metal working compositions according to claim 2 wherein the concentration of (b) is from 0.01% to 20% by weight of the weight of water plus (b).

30. Metal working compositions according to claim 29 wherein the concentration of (b) is from 0.03% to 5% by weight.

* * * * *

UNITED STATES PATENT AND TRADEMARK OFFICE
CERTIFICATE OF CORRECTION

PATENT NO. : 4,172,802
DATED : 10/30/79
INVENTOR(S) : Walter E. Rieder

It is certified that error appears in the above-identified patent and that said Letters Patent are hereby corrected as shown below:

At Claim 14 (column 15, line 60) change "11 to 4" to read

---- 1 to 4 ----

Signed and Sealed this

Eleventh Day of November 1980

[SEAL]

Attest:

SIDNEY A. DIAMOND

Attesting Officer

Commissioner of Patents and Trademarks